US009084208B2

(12) United States Patent
Rosenqvist et al.

(10) Patent No.: US 9,084,208 B2
(45) Date of Patent: Jul. 14, 2015

(54) ENERGY-EFFICIENT NETWORK METHODS AND APPARATUS

(75) Inventors: Anders Rosenqvist, Lund (SE); Bengt Lindoff, Bjärred (SE); Johan Nilsson, Höllviken (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 919 days.

(21) Appl. No.: 12/705,879

(22) Filed: Feb. 15, 2010

(65) Prior Publication Data

US 2011/0201334 A1 Aug. 18, 2011

(51) Int. Cl.
*H04W 52/34* (2009.01)
*H04W 52/40* (2009.01)
*H04W 52/02* (2009.01)
*H04W 16/04* (2009.01)
*H04L 5/00* (2006.01)
(Continued)

(52) U.S. Cl.
CPC ............. *H04W 52/343* (2013.01); *H04L 5/001* (2013.01); *H04W 52/0206* (2013.01); *H04W 52/40* (2013.01); *H04L 5/0023* (2013.01); *H04L 5/0048* (2013.01); *H04W 8/26* (2013.01); *H04W 16/04* (2013.01); *H04W 24/00* (2013.01); *H04W 36/14* (2013.01); *H04W 88/08* (2013.01); *Y02B 60/50* (2013.01)

(58) Field of Classification Search
CPC ..... H04W 24/02; H04W 16/00; H04W 16/02; H04W 16/04; H04W 16/06; H04W 16/08; H04W 16/10; H04W 16/12; H04L 5/0053

USPC ............ 455/436, 69, 450–453, 574; 375/224; 370/225, 328–334, 431–437
See application file for complete search history.

(56) References Cited

U.S. PATENT DOCUMENTS 7,003,022 B2    2/2006  Urabe et al.
7,088,959 B2 *  8/2006  Ho et al. ................... 455/69
(Continued)

FOREIGN PATENT DOCUMENTS

EP    2112771 A1    10/2009
GB    2377855 A      1/2003
(Continued)

OTHER PUBLICATIONS

Technical Specification 36.211 V8.9.0, Physical Channels and Modulation (Release 8), Dec. 2009, Sections 6.10, 6.11,Third Generation Partnership Project.

(Continued)

*Primary Examiner* — Dwayne Bost
*Assistant Examiner* — Nalini Mummalaneni
(74) *Attorney, Agent, or Firm* — Patent Portfolio Builders PLLC

(57) ABSTRACT

Methods and apparatus for changing the transmission/reception setup of a base station (BS) in a communication network to another transmission/reception setup (such as one using fewer transmit antennas and/or lower channel bandwidths) without affecting communication with user equipments involve "replacing" the existing BS with a "virtual" BS that has the other transmission/reception setup. Replacement can be performed by, for example, ramping down the power of the existing, or first, BS, which has a respective first cell identification (ID), and simultaneously ramping up the power of the virtual, or second, BS, which has a respective second cell ID.

18 Claims, 5 Drawing Sheets

(51) Int. Cl.
*H04W 8/26* (2009.01)
*H04W 24/00* (2009.01)
*H04W 36/14* (2009.01)
*H04W 88/08* (2009.01)

(56) References Cited

U.S. PATENT DOCUMENTS

| | | | |
|---|---|---|---|
| 2004/0038682 A1* | 2/2004 | Persson et al. | 455/436 |
| 2004/0166901 A1* | 8/2004 | Umesh et al. | 455/561 |
| 2005/0105647 A1 | 5/2005 | Wilhelmsson et al. | |
| 2007/0160156 A1 | 7/2007 | Melzer et al. | |
| 2007/0218905 A1* | 9/2007 | Lee | 455/436 |
| 2008/0004034 A1* | 1/2008 | Takata et al. | 455/453 |
| 2008/0031368 A1 | 2/2008 | Lindoff et al. | |
| 2008/0242308 A1 | 10/2008 | Gunnarsson et al. | |
| 2009/0318161 A1* | 12/2009 | Lopes | 455/453 |
| 2010/0048212 A1* | 2/2010 | Yavuz et al. | 455/436 |
| 2010/0177721 A1* | 7/2010 | Simonsson et al. | 370/329 |
| 2010/0182903 A1* | 7/2010 | Palanki et al. | 370/225 |
| 2011/0129008 A1* | 6/2011 | Chmiel et al. | 375/224 |

FOREIGN PATENT DOCUMENTS

| | | |
|---|---|---|
| WO | 00/72618 A1 | 11/2000 |
| WO | 2007/041845 A1 | 4/2007 |
| WO | 2008/115110 A1 | 9/2008 |
| WO | WO 2009115554 A1 * | 9/2009 |

OTHER PUBLICATIONS

Technical Specification 36.213 V8.8.0, Physical Layer Procedures (Release 8), Sep. 2009, Section 4.1, Third Generation Partnership Project.

Technical Specification 36.214 V8.7.0, Physical Layer—Measurements (Release 8), Sep. 2009, Section 5.1, Third Generation Partnership Project.

Technical Specification 36.304 V8.8.0, User Equipment (UE) Procedures in Idle Mode (Release 8), Dec. 2009, Section 5.2, Third Generation Partnership Project.

EPO, Int'l Search Rpt in PCT/EP2011/050827, Apr. 29, 2011.

EPO, Written Opinion in PCT/EP2011/050827, Apr. 29, 2011.

Lee et al., Dynamic Reservation Scheme of Physical Cell Identity for 3GPP LTE Femtocell Systems, J. Info Processing Systems, Dec. 2009, vol. 5, No. 4, pp. 207-220.

* cited by examiner

ENERGY-EFFICIENT NETWORK METHODS AND APPARATUS

TECHNICAL FIELD

This invention relates to electronic communication systems, and more particularly to operation of transmitters and receivers in radio communication systems.

BACKGROUND

There is an increasing interest in reducing power consumption in communication systems, particularly the power consumption of base stations in cellular radio telephone systems. Reducing power consumption on the user side of a system, i.e., mobile phones, portable computers, and other user equipments (UEs), has been a long-time effort, not least because UEs are often battery-powered. The desire for improved energy efficiency on the network side, i.e., base stations and other network nodes, is mainly driven by the cost to the network operator of transmitting "unnecessary" signals in cases of low network load.

Communication systems that can have "unnecessary" signals are, among others, systems that conform to the High Speed Packet Access (HSPA) and Long Term Evolution (LTE) telecommunication standards. HSPA systems and LTE systems, which can include HSPA, are sometimes called "third generation" (3G) cellular communication systems and are currently being standardized by the Third Generation Partnership Project (3GPP). The LTE specifications can be seen as an evolution of the current wideband code division multiple access (WCDMA) specifications. An IMT-Advanced communication system (i.e., a "fourth generation" (4G) system) uses an internet protocol (IP) multimedia subsystem (IMS) of an LTE, HSPA, or other communication system for IMS multimedia telephony (IMT). The 3GPP promulgates the LTE, HSPA, WCDMA, and IMT specifications, and specifications that standardize other kinds of cellular wireless communication systems.

In an LTE system, an enhanced Node B (eNB), or base station (BS), can be configured for downlink (DL) channels that have bandwidths ranging from about 1.4 megahertz (MHz) to 20 MHz for communicating with UEs. Such channels are supported by pilot signals having standardized patterns corresponding to the channel bandwidth, with lower-bandwidth channels requiring transmission of fewer pilot signals than higher-bandwidth channels. It is possible for an eNB to be set for 20-MHz bandwidth channels at times when that bandwidth is not needed, e.g., because there are not enough UE-requests for data transmissions. Thus, despite not all DL resource blocks (RBs) being populated with data, the standardized but unnecessary pilot signal pattern is transmitted, wasting energy in the eNB, and UEs patiently do their jobs reporting unnecessary channel quality indicators (CQIs) for large numbers of unused resource blocks, wasting energy in the UEs.

In an HSPA system, a BS can be configured for transmit (TX) diversity and so have two active transmitters with respective pilot signal patterns set up for HSPA multiple-input multiple-output (MIMO) dual stream transmission. Nevertheless, such operation may be unnecessary because there may not be any MIMO-capable UEs in the vicinity of the BS. There may not even be any nearby UEs capable of receiving a TX diversity scheme and/or the UEs that are nearby may not be requesting much downlink data at that moment. Thus, a BS configured for TX diversity wastes energy transmitting unnecessary pilot signals by its second transmitter when it is configured for high-speed data while such high data speeds are not used. In addition, the UEs in the vicinity of a TX-diversity BS may be of a less capable kind or even have trouble processing the TX-diversity pilot signals properly, and so those UEs may waste battery energy on processing the more complicated TX-diversity pilot signals and/or may suffer decreased system performance.

FIG. 1 depicts a typical cellular radio communication system 10. Radio network controllers (RNCs) 12, 14 control various radio network functions, including for example radio access bearer setup, diversity handover, etc. In general, each RNC directs calls to and from a UE, such as a mobile station (MS), mobile phone, or other remote terminal, via appropriate BSs, which communicate with each other through DL (or forward) and uplink (UL, or reverse) channels. In FIG. 1, RNC 12 is shown coupled to BSs 16, 18, 20, and RNC 14 is shown coupled to BSs 22, 24, 26.

Each BS, or eNB in an LTE system, serves a geographical area that is divided into one or more cell(s). In FIG. 1, BS 26 is shown as having five antenna sectors S1-S5, which can be said to make up the cell of the BS 26, although a sector or other area served by signals from a BS can also be called a cell. As described above, a BS can use more than one antenna to transmit signals to a UE. The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

It should be understood that the arrangement of functionalities depicted in FIG. 1 can be modified in LTE and other communication systems. For example, the functionality of the RNCs 12, 14 can be moved to the eNBs 22, 24, 26, which is typically so in an LTE system, and other functionalities can be moved to other nodes in the network. For example according to a System Architecture Evolution (SAE) being standardized by 3GPP, the eNBs 22, 24, 26 communicate with an SAE gateway node in the core network via an S1 interface, with the eNBs and SAE gateway comprising a user plane of the SAE architecture.

The LTE physical layer, including the physical downlink shared channel (PDSCH) and other LTE channels, is described in 3GPP Technical Specification (TS) 36.211 V8.7.0, Physical Channels and Modulation (Release 8) (June 2009), among other specifications. LTE communication systems are described in the literature, for example, U.S. Patent Application Publication No. US 2008/0031368 A1 by B. Lindoff et al. For cell measurements, channel estimation, and other purposes, pilot signals, or reference symbols or signals (RS), are transmitted from each eNB at known frequencies and time instants. RS are described for example in Sections 6.10 and 6.11 of 3GPP TS 36.211, and are transmitted from each of possibly 1, 2, or 4 transmit antennas of an eNB on particular resource elements (REs). Comparable specifications and literature are available for WCDMA and other communication systems.

FIG. 2 shows an arrangement of subcarriers in RBs in two successive time slots, which can be called a sub-frame, in an LTE system. Like many modern digital communication systems, LTE and HSPA signals are organized in frames, and the length of an LTE frame is twenty slots. The frequency range depicted in FIG. 2 includes twenty-seven subcarriers, only nine of which are explicitly indicated. In FIG. 2, the RBs, which are indicated by dashed lines, each include twelve subcarriers spaced apart by fifteen kilohertz (kHz), which together occupy 180 kHz in frequency and 0.5 ms in time, or one time slot. FIG. 2 is scaled such that it shows each time slot including seven symbols, or REs, each of which has a short (normal) cyclic prefix, although six OFDM symbols having long (extended) cyclic prefixes can be used instead in a time slot. It will be understood that RBs can include various numbers of subcarriers for various periods of time.

RS transmitted by a first TX antenna of an eNB are denoted R and by a possible second TX antenna in the node are denoted by S. RS are transmitted on every sixth subcarrier in OFDM symbol 0 and OFDM symbol 4 (because the symbols have short cyclic prefixes) in every slot. Also in FIG. 2, the RSs in symbols 4 are offset by three subcarriers relative to the RS in OFDM symbol 0, the first OFDM symbol in a slot.

Besides reference signals, predetermined synchronization signals are provided for a cell search procedure that is a UE carries out in order to access the system, or network. The cell search procedure includes synchronizing the UE's receiver with the frequency, symbol timing, and frame timing of a cell's transmitted signal, and determining the cell's physical layer cell ID. The cell search procedure for an LTE system is specified in, for example, Section 4.1 of 3GPP TS 36.213 V8.6.0, Evolved Universal Terrestrial Radio Access (E-UTRA), Physical Layer Procedures (Release 8), June 2009. LTE uses a hierarchical cell search scheme similar to WCDMA, in which eNB-UE synchronization and a cell group identity (ID) are obtained from different synchronization channel (SCH) signals. A primary synchronization signal (PSS) and a secondary synchronization signal (SSS) are defined with a pre-defined structure in Section 6.11 of 3GPP TS 36.211.

FIG. 2 shows the SSS and PSS as OFDM symbols 5, 6 (assuming operation with the short cyclic prefix and frequency-division duplex (FDD). Current LTE systems have the PSS and SSS symbols transmitted in the middle six RBs (i.e., the middle seventy-two subcarriers) in sub-frames 0 and 5. In general, a UE uses the PSS to synchronize to the slots and the SSS to synchronize to the frames in an LTE system. Comparable reference and synchronization channels are often provided in other digital communication systems, although they may be given different names.

As discussed above, a BS can have a transmission/reception setup that is not currently necessary and so it is desirable to improve the efficiency of BS operation.

SUMMARY

In accordance with aspects and embodiments of this invention, there is provided a method of operating a node for a communication system. The method includes operating the node with a first transmission/reception (TX/RX) setup with a first node identification (ID); monitoring a load on the node; determining whether the load has crossed a threshold; and if the load has crossed the threshold, gradually transitioning the node to operating with a second TX/RX setup with a second node ID. The second TX/RX setup, with respect to the first TX/RX setup, includes at least one of fewer antennas, smaller bandwidth, and fewer component carriers or subcarriers.

Also in accordance with aspects and embodiments of this invention, there is provided an apparatus for a node for a communication system. The apparatus includes a scheduler and selector configured to receive information to be transmitted by the node; a signal generator configured to generate a signal corresponding to the information for transmission by the node through at least one antenna, wherein the signal includes a first node ID or a second node ID; and a control processor configured to monitor a transmission load on the node and, based on whether the load has crossed a threshold, to gradually transition the node from operating with a first TX/RX setup with the first node ID to operating the node with a second TX/RX setup with the second node ID. The second TX/RX setup, with respect to the first TX/RX setup, includes at least one of fewer antennas, smaller bandwidth, and fewer component carriers or subcarriers.

Also in accordance with aspects and embodiments of this invention, there is provided a computer-readable medium having stored instructions that, when executed by a computer, cause the computer to carry out a method of operating a node in a communication system. The method includes operating the node with a first TX/RX setup with a first node identification ID; monitoring a load on the node; determining whether the load has crossed a threshold; and if the load has crossed the threshold, gradually transitioning the node to operating with a second TX/RX setup with a second node ID. The second TX/RX setup, with respect to the first TX/RX setup, includes at least one of fewer antennas, smaller bandwidth, and fewer component carriers or subcarriers.

BRIEF DESCRIPTION OF THE DRAWINGS

The several features, advantages, and objects of this invention will be understood by reading this description in conjunction with the drawings, in which.

DETAILED DESCRIPTION

Figure 1:
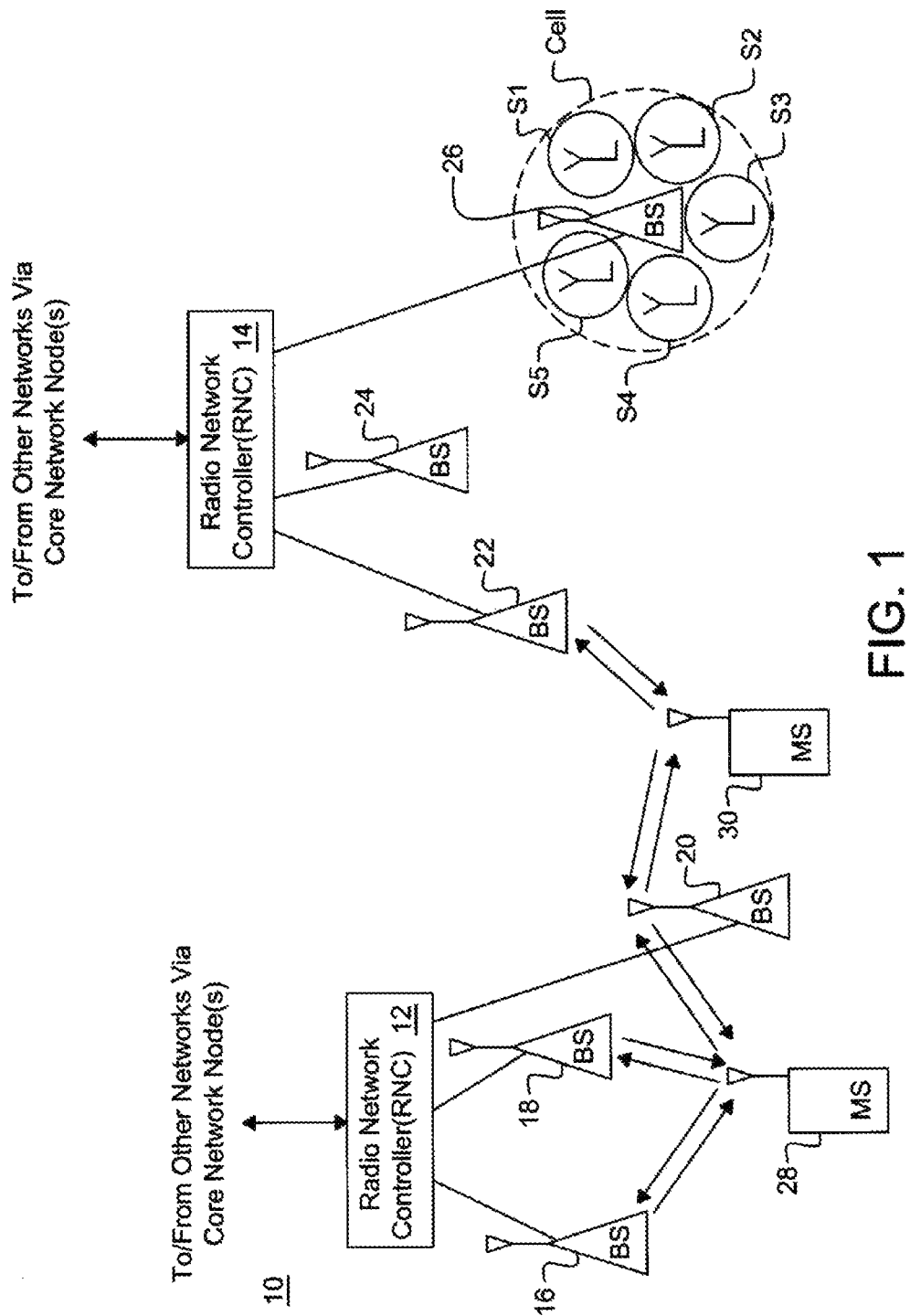
FIG. 1 depicts a cellular radio communication system.
Figure 2:
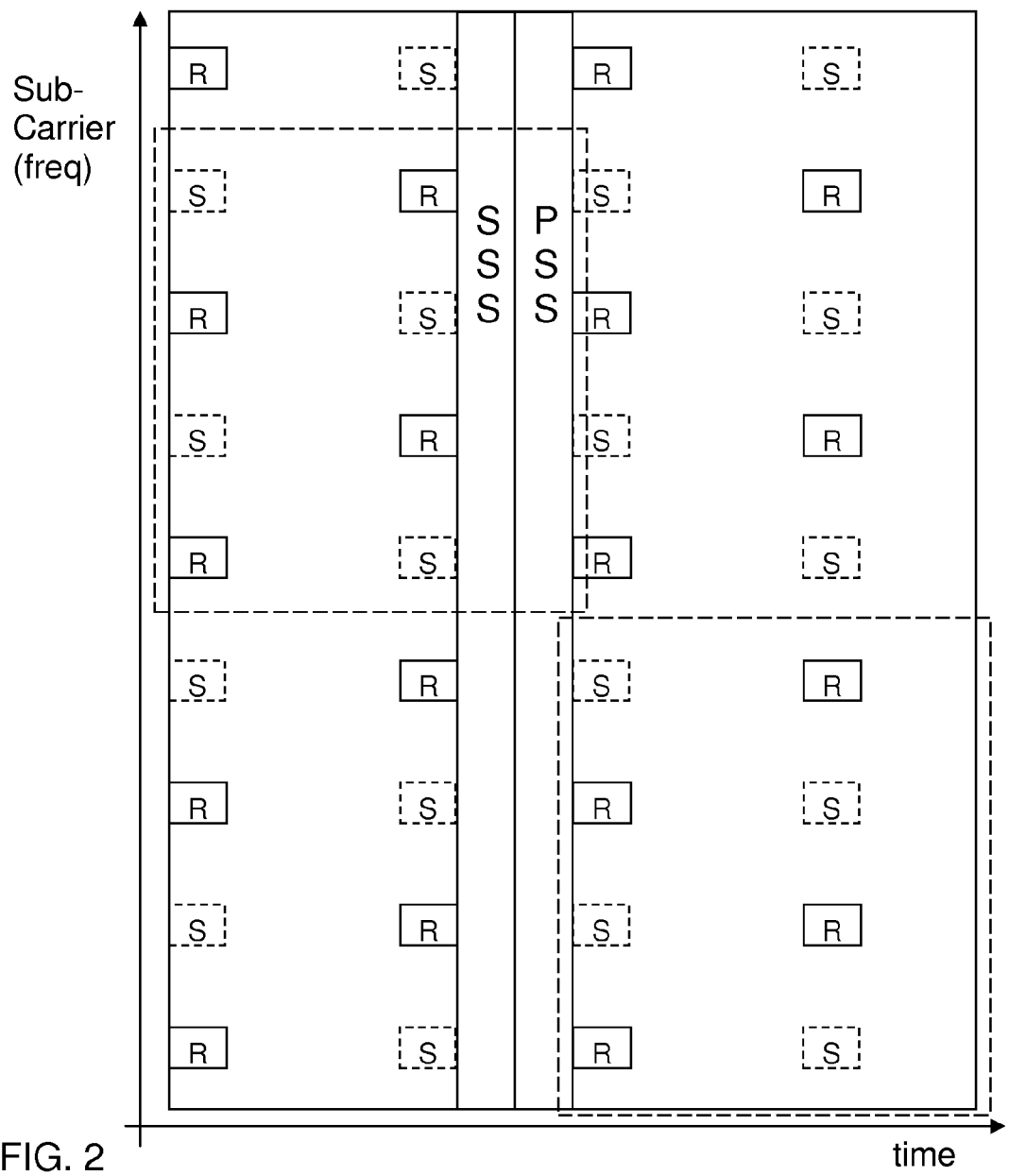
FIG. 2 depicts reference, primary synchronization, and secondary synchronization symbols in a communication system that uses orthogonal frequency division multiple access.

This description focusses on an LTE communication system for economy of explanation, but the artisan will understand that the invention in general can be implemented in other electronic communication systems.

Compared to the HSPA and LTE examples described above, other BS transmission/reception setups, such as single-TX-antenna mode and smaller bandwidths, require less electrical energy at a BS, and due for example to less signal processing, can require less electrical energy at a UE. Nevertheless, changing the transmission/reception setup of a BS may not be permitted due to restrictions in some system specifications, and even if it is, mechanisms for trouble-free changing a BS setup do not always exist. Thus, a BS may continue to operate inefficiently. In addition, there may be no way to inform an affected UE of a BS-setup change, and even if there is, the UE may not pay attention to such information. Thus, a UE may continue to operate inefficiently (or even worse, faultily) as if there were no change of BS setup.

The inventors have recognized that it is desirable to remedy the absence of a standardized mechanism for signaling from a BS to a UE that there will be a change in BS transmission/reception setup, e.g., a change in bandwidth, a decrease in the number of active TX antennas, etc. It is also desirable to have a mechanism for changing BS transmission/reception modes/parameters that is consistent with current standards and hence does not negatively affect existing UEs.

The inventors have recognized that a BS's existing transmission/reception setup can be changed to another, desired, transmission/reception setup (such as one using fewer transmit antennas and/or lower channel bandwidths) without affecting communication with UEs in the vicinity of the BS by "replacing" the existing BS with a "virtual" BS that has the desired transmission/reception setup. Replacement can be performed by ramping down the power of the existing, or first, BS, which has a respective first cell identification (ID), and simultaneously ramping up the power of the virtual, or second, BS, which has a respective second cell ID. In such an embodiment, one physical BS is able to appear simultaneously as two BSs with two cell IDs. UEs that are camped on or connected to the existing BS will gradually, eventually, be handed over from the existing BS (i.e., the first cell ID) to the virtual BS (i.e., the second cell ID). The transmitted power of the existing BS with the first setup and cell ID can then be set to zero, and any UE connections can be continued using the second cell ID and the second setup.

If the hardware or software of a BS is incapable of enabling the BS to appear simultaneously as two BSs with two cell IDs (despite the presumably low load on the BS), the transmission power of the existing BS can simply be ramped down completely before the "virtual" BS power is either switched on abruptly or gradually ramped to full power. To avoid dropping connections and other problems with this alternative procedure, it is preferable for coverage and free capacity of at least one third BS to be available. Such a third BS should have a signal level at a UE that is nearly as good as the signal level from the first BS and is likely to be geographically near the first BS.

The multiple cell IDs that a BS has can be allocated to the BS in any known way. Cell IDs are typically allocated in advance to BSs in a network to minimize interference and confusion between BSs. For example, an LTE communication system has 504 available physical layer cell IDs, as specified for example in Clause 6.11 of 3GPP TS 36.211 V8.9.0, Physical Channels and Modulation (Release 8) (December 2009). Many methods of network planning, including cell ID assignment, are known in the art.

Fast and efficient cell searches and received signal measurements are important for a UE to get and stay connected to a suitable cell. In general, cell search is the procedure by which a UE acquires time and frequency synchronization with a cell and detects the cell ID of that cell. Cell search is based on the downlink primary and secondary synchronization signals and the downlink reference signals.

When a UE is in its active mode, it is connected to at least one cell, which can be called a "serving cell". When a UE is in its idle mode, the UE "camps on" a cell in order to listen for paging messages directed to it. In both modes, a UE carries out cell search on a regular basis to detect new serving cell candidates (active) or new cells to camp on (idle). A new cell can be on the same frequency as a current cell or on a different frequency. Cell search in the UE's active mode is specified for example in Clause 4 of 3GPP TS 36.213 V8.8.0, Physical Layer Procedures (Release 8) (September 2009) and Clause 5.1 of 3GPP TS 36.214 V8.7.0, Physical Layer—Measurements (Release 8) (September 2009). Cell search in the UE's idle mode is specified for example in Clause 5.2 of 3GPP TS 36.304 V8.4.0, User Equipment (UE) Procedures in Idle Mode (Release 8) (December 2008).

Figure 3:
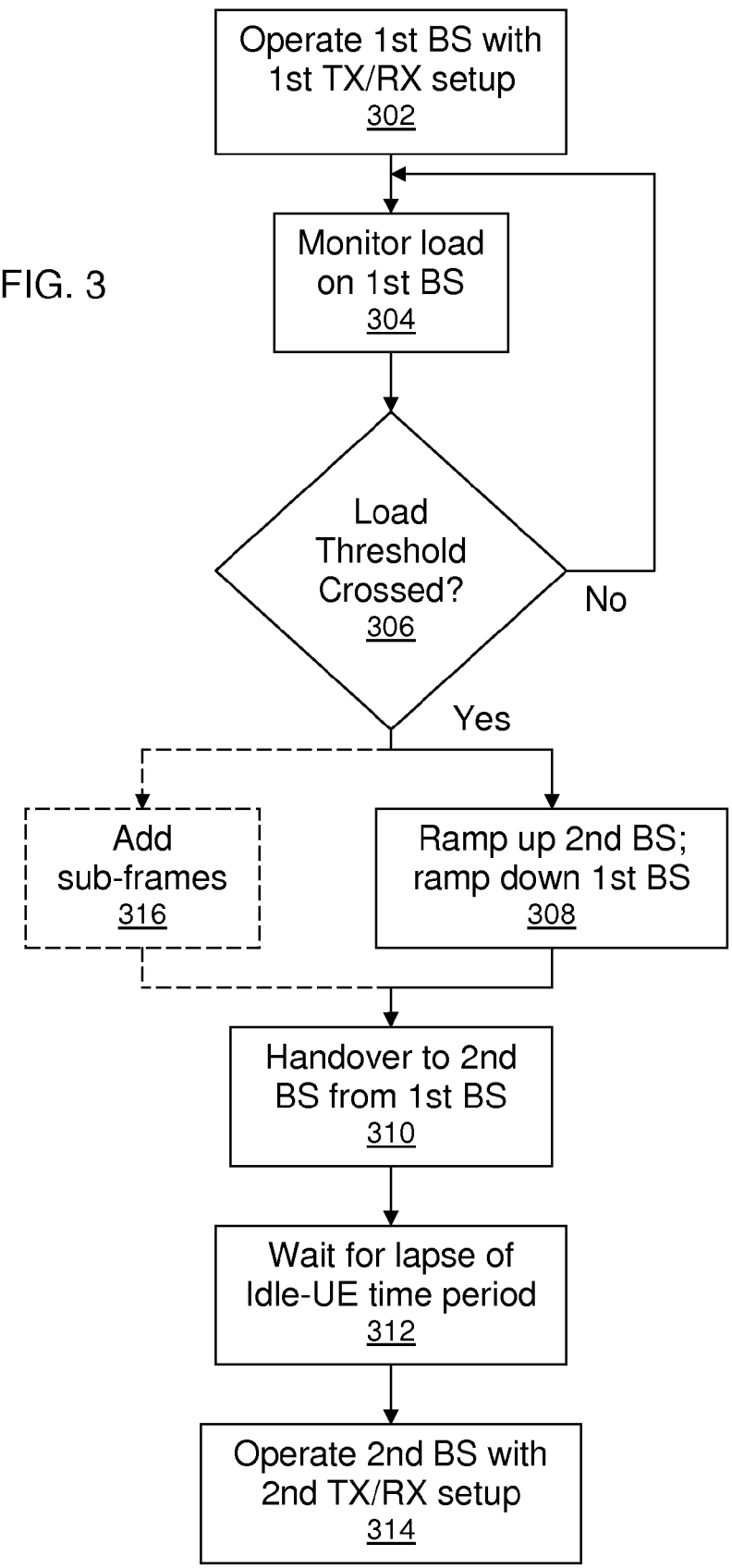
FIG. 3 is a flow chart of a method of operating a node, such as a base station, in a communication network.

FIG. 3 is a flow chart of a method of operating a node, such as a BS or eNB, in accordance with this invention. In step 302, a first BS operates using a first transmission/reception (TX/RX) setup with a first cell ID. In that condition, there can be one or more UEs with active connections to the first BS or that are camped on the first BS (i.e., the UEs are idle).

In step 304, the load on the first BS is monitored, for example by a suitable traffic analyzer. As long as the cell load is within a range suitable for the current transmission/reception setup, the first BS continues operating with the first transmission/reception setup. In general, the load on the first BS can be monitored by determining the total number of RBs or channelization codes allocated, depending on the type of communication system. RBs and REs generally relate to LTE and equivalent OFDM systems, and channelization codes generally relate to WCDMA, HSPA, and equivalent systems, in which each UE is allocated a respective channelization code. The load on a BS can also be monitored by determining the BS buffer status, e.g., how much data is waiting for available bandwidth to be transmitted to all connected UES in relation to the number of RBs and REs or channelization codes being and recently transmitted. The load on a BS can also be monitored by determining the number of its connected UEs.

In step 306, it is determined whether the cell load has crossed a threshold and so a second, different, transmission/reception setup should be used. The second setup can include, for instance, fewer or more TX antennas, smaller or larger system bandwidth, fewer or more component carriers or subcarriers, etc. For example in an LTE system, a suitable threshold is currently believed to be in the range of about 5% to about 20% of the maximum allocable RBs, and the threshold can vary with hysteresis so that, for example, the threshold is 5% for switching the transmission/reception setup from a larger capacity to a smaller capacity and is 20% for switching the transmission/reception setup from a smaller capacity to a larger capacity.

If it is determined that the cell load has crossed the threshold (Yes in step 306), the second BS gradually ramps up the transmission power of its pilot, synchronization, and other signals as the first BS gradually ramps down the transmission power of its pilot and synchronization signals, and possibly other signals (step 308). If is determined that the cell load has not crossed the threshold (No in step 306), the process flow returns to step 304.

As a result of step 308, active and idle UEs begin to carry out their cell search procedures, find the second BS, and eventually trigger handovers from the first BS to the second BS when the pilot and synchronization signals of the second BS are significantly stronger than those signals of the first BS (step 310). During the process of handover from the first to the second BS, it is possible that a UE is handed over briefly to a third BS that is almost as "good", signal-wise, as the first and second BSs until the power of the second BS has ramped up high enough. The first BS processes the UEs' handover requests and hands over the UEs to the second BS using the applicable procedures specified for the communication system.

Besides handing over UEs, the first BS advantageously waits for the lapse of a time period before completely powering off (step 312). A suitable time period is one that is sufficient to ensure that idle UEs have made a cell reselection and is typically determined by the cell reselection requirements of the application communication system specifications. A time period on the order of 10-60 seconds is currently believed suitable for a communication system like LTE, in which UE cell reselection in idle mode takes on the order of ten seconds, and it is currently expected that a BS might change its transmission/reception setup at a rate of a few times per hour or so. The time period can be measured by a suitable timer implemented in the first BS. The first BS is then powered down and communication proceeds with the second BS operating with the second TX/RX setup and the UEs (step 314).

In an optional step 316, indicated by the dashed lines, the first BS in an LTE or equivalent communication system adds one or more free sub-frames that can be used for transmissions of the second BS, instead of ramping up the second BS power and ramping down the first BS power (step 308). Free sub-frames are sub-frames that do not carry user data, but they can still contain control and reference symbols (and possibly also PSS/SSS) in the LTE system example. It is currently believed sufficient to perform either step 308 or step 316, but it should be understood that the method can include both step 308 and step 316.

To make room for the added DL sub-frames, the first BS can, for example, offset the timing between sub-frames respectively transmitted by the first and second BSs by an amount such that pilot, synchronization, and control signals from the first and second BSs are not transmitted at the same time. Besides avoiding signal collisions in time, offsetting the timing of DL sub-frames from the first and second BSs may be necessary due to BS hardware constraints on its maximum transmitted power. The artisan will understand that some BSs are limited to maximum transmitter powers of twenty watts.

Figure 4:
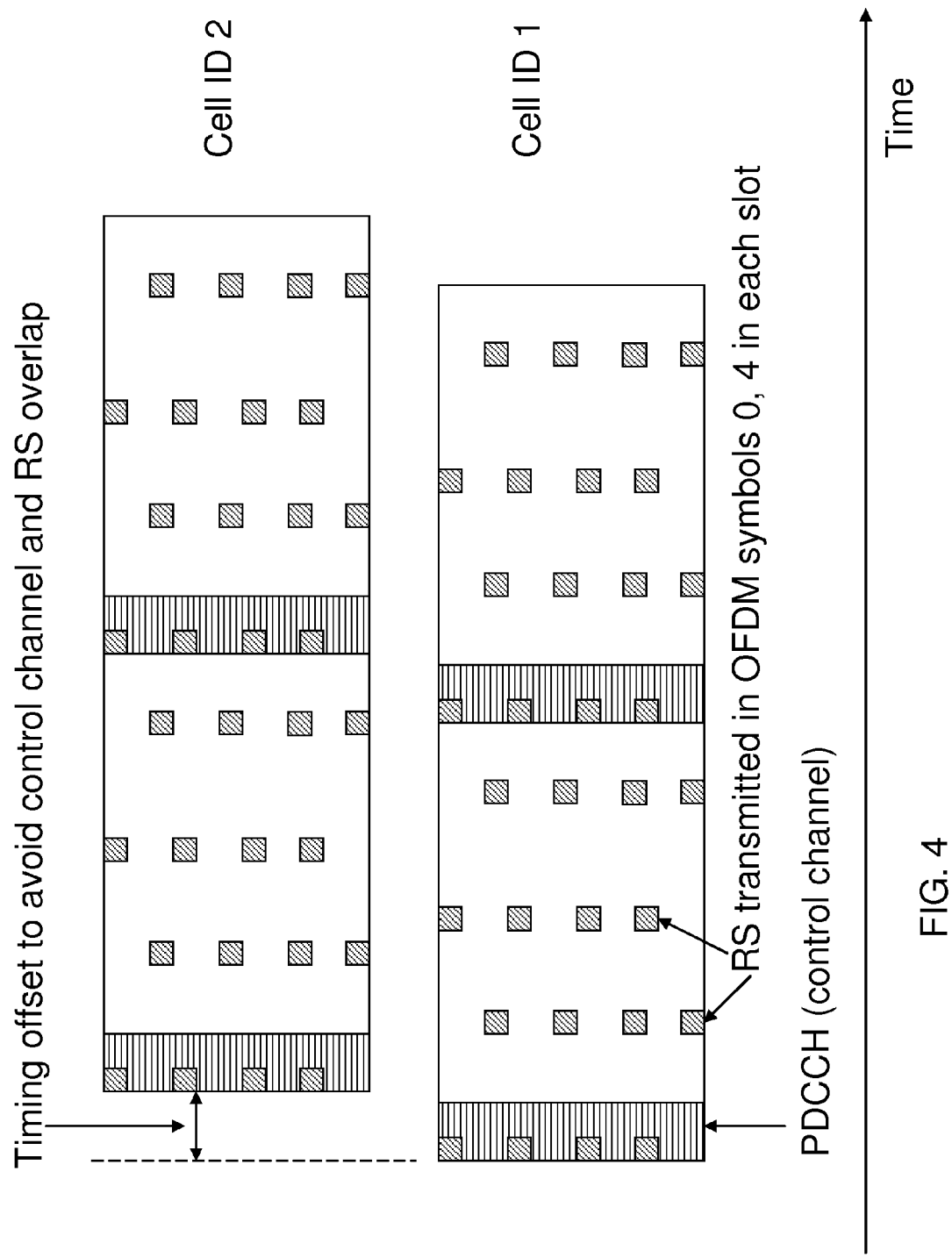
FIG. 4 illustrates timing offset of sub-frames transmitted by a base station using first and second cell identifications.

FIG. 4 illustrates an LTE example of a suitable timing offset of sub-frames transmitted by a BS using a cell ID 1 and a cell ID 2. The figure shows a succession of sub-frames and slots for each cell ID that include RS as described above and a conventional physical downlink control channel (PDCCH), which carries UE-specific control information. The PDCCH comprises REs in up to the first three OFDM symbols in the first slot of a sub-frame, and FIG. 4 depicts the timing offset as just those three symbols. It will be understood, however, that other offsets are suitable. It will be further understood that after a UE has been handed over from cell ID 1 to cell ID 2, the UE adjusts its UL timing to the cell-ID-2 UL timing, which is based on the cell-ID-2 DL timing, according to the procedures specified for the communication system.

As described above, the BS's TX/RX setup includes at least one of the number of TX and/or receive antennas used for communication, the system bandwidth (for LTE, 1.4-20 MHz), the number of aggregated carriers (for LTE and LTE-Advanced), etc. For an LTE system, the BS adjusts the system bandwidth by adjusting the number of RBs or REs used for communication with a respective UE. (The artisan will recall that the LTE UL uses single-carrier frequency division multiple access (SC-FDMA), which is basically pre-coded OFDM.) In "carrier aggregation" for bandwidths greater than 20 MHz, multiple carrier components, each of which may be up to 20 MHz wide, are aggregated together. The UE then receives multiple component carriers, with each component carrier having, or at least the possibility of having, the same structure as an ordinary LTE carrier. Carriers can be aggregated contiguously, or they can be aggregated from discontinuous portions of the frequency spectrum.

Although an eNB can implement the methods described above by itself for itself, it will be appreciated that an eNB or other network node can be configured to coordinate implementation of the methods by one or more eNBs. For example, a BS can monitor its load and send suitable load reports to another BS, an RNC, an SAE gateway, etc. that is configured to determine whether the load threshold has been crossed and then to order the reporting BS to create a second "virtual" BS. This can be beneficial in that a higher-level node, like an RNC or an SAE gateway, can be in a position to know the loads and positions of other BSs in the network and to order UEs to hand over to the virtual BS either directly or through suitable third BSs. In addition, handover "chaos", with too many BSs doing setup transitioning at more or less the same time, can be avoided.

With embodiments of this invention, a BS or eNB can change its transmission mode to a more power-efficient transmission mode (e.g., change from many TX antennas to only one TX antenna and/or from a wider bandwidth to a smaller bandwidth) in case of low load in a way that does not harm the operation of existing UEs and does not impact existing system specifications.

Figure 5:
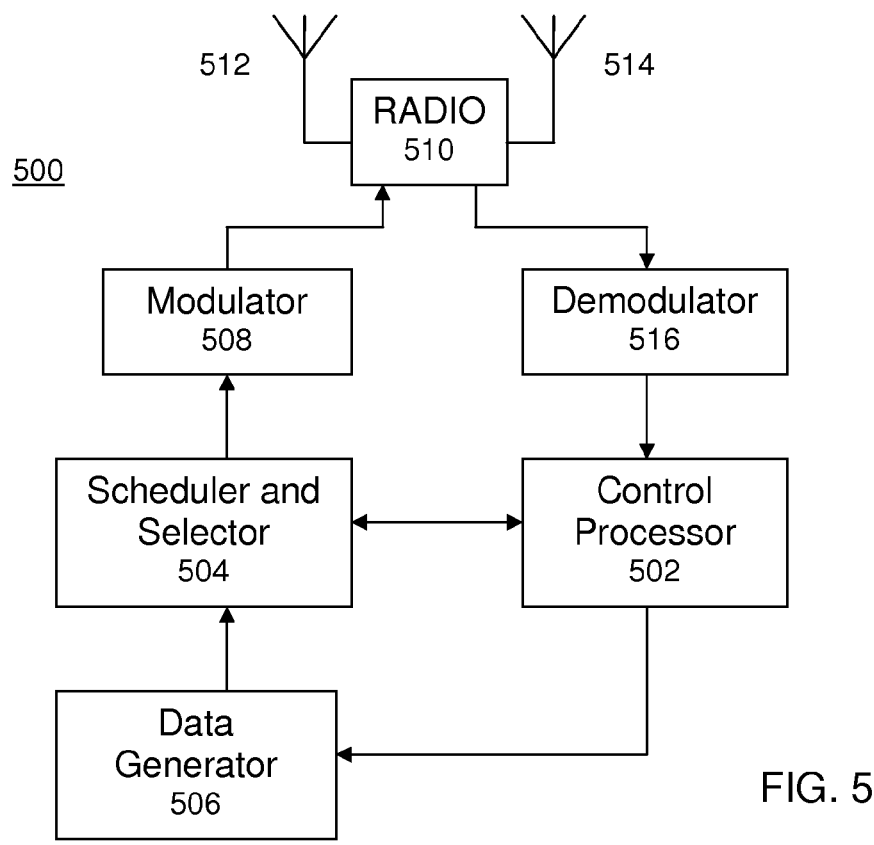
FIG. 5 is a block diagram of a base station that can implement the methods described in this application.

FIG. 5 is a block diagram of a portion of an eNB 500, which is typical of the BSs 16, 18, 20, 22, 24, 26 and other such transmitting nodes in the network 10 that can communicate with UEs by implementing the methods described above. It will be appreciated that the functional blocks depicted in FIG. 5 can be combined and re-arranged in a variety of equivalent ways, and that many of the functions can be performed by one or more suitably programmed digital signal processors and other known electronic circuits.

The eNB 500 is operated by a control processor 502, which typically and advantageously is a suitably programmed digital signal processor. The control processor 502 typically provides and receives control and other signals from various devices in the eNB 500. For simplicity in FIG. 5, the control processor 502 is shown exchanging information with a scheduler and selector 504, which receives digital words to be transmitted to respective UEs or to be broadcast from a suitable data generator 506. The scheduler and selector 504 implements RB/RE scheduling and selection in an LTE system, for example, and implements code allocation in a WCDMA/HSPA system, for example.

The control processor 502 is configured to monitor the load on the eNB, which can be determined for example simply by counting the RBs and REs to be transmitted in a sub-frame, frame, or group of them. A processor such as the control processor 502 can also be configured as a traffic analyzer that determines the load on a BS by monitoring the BS buffer status, e.g., how much data is waiting for available bandwidth to be transmitted to all connected UES in relation to the number of RBs and REs being and recently transmitted. As discussed above, the load on a BS can also be determined based on the number of its connected UEs, or in a WCDMA, HSPA, or equivalent system, based on the number of allocated channelization codes. Based on the determined load, the processor 502 implements other steps of the methods described above.

Information from the scheduler and selector 504 is provided to a modulator 508 that uses the information to generate a modulation signal suitable for the particular communication system. For example, the modulator 508 in an LTE system is an OFDM modulator. The modulation signal generated by the modulator 508 is provided to a suitable radio circuit 510 that generates a wireless signal that is transmitted through at least one transmit antenna 512. Wireless signals transmitted by UEs are captured by at least one receive antenna 514 that provides those signals to the radio 510 and a demodulator 516. The artisan will understand that the same antenna can be used for transmission and reception, as is often done in a UE.

It will be understood that the control processor 502 can be configured such that it includes one or more other devices depicted in FIG. 5, which can be implemented by dedicated programmed processors or other suitable logic configured to perform their functions. The combination of the data generator 506, scheduler and selector 504, and modulator 508 produces DL frames or sub-frames to be transmitted. The modulator 508 converts the information into modulation symbols that are provided to the radio 510, which impresses the modulation symbols on one or more suitable carrier signals. In an LTE system for example, the radio 510 impresses the modulation symbols on a number of OFDM subcarriers. The modulated subcarrier signals are transmitted through the antenna 512.

Figure 6:
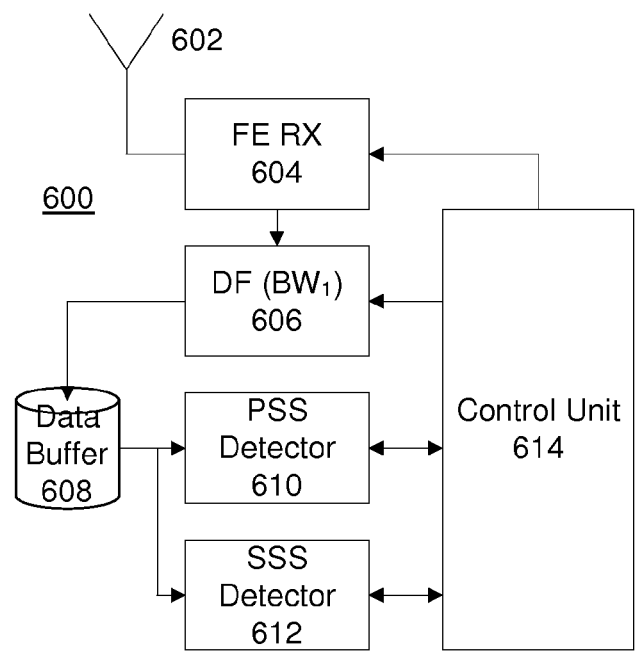
FIG. 6 is a block diagram of a user equipment for a communication system.

FIG. 6 is a block diagram of a portion 600 of a UE that is suitable for receiving eNB signals as described in this application. Portions of radio signals transmitted by an eNB are collected by one or more antennas 602 and passed to a receiver front end (FE RX) 604 that typically down-converts the received radio signal to an analog baseband signal. The baseband signal is spectrally shaped by a suitable digital filter (DF) 606 that has a bandwidth BW1, which corresponds to the bandwidth of the pilot and synchronization signals (e.g., OFDM symbols in an LTE system) included in the transmitted/received signal. The shaped baseband signal generated by the filter 606 can be temporarily stored in a data buffer 608 that provides the stored signal to a PSS Detection unit 610 and an SSS Detection unit 612. The Detection units 610, 612 carry out one or more methods of searching for cells as specified for the particular communication system, e.g., LTE, that typically involve detecting the predetermined PSS and SSS in the received signal. The Detection units 610, 612 communicate their results by suitable signals to a control unit 614, which also controls the operation of the FE RX 604, DF 606, and Detection units 610, 612. The control unit 614 keeps track of information needed to configure the filter 606 and detection unit 610, 612. Communication between the detection units 610, 612 and the control unit 614 can include cell ID, for example.

The PSS Detection unit 610 can include any suitable kind of correlator that is matched to the time-domain representation of the PSS, SSS, or equivalent synchronization signal, which is to say that the receiver includes a matched filter having an impulse response that corresponds to a mirrored (time-reversed) complex-conjugate of the PSS. It will be understood that such matched filters can be implemented in hardware devices, such as tapped delay lines, correlators that compare input sequences to expected sequences, and equivalent devices, or as a suitably programmed or configured electronic processor. For example, U.S. Pat. No. 7,003,022 to Urabe et al. describes matched filters and receivers for mobile radio communication systems. The control unit 614 is suitably configured to compare the real parts or magnitudes of the outputs of all of the matched filters in the unit 610 and select that filter having the highest correlation peak according to a method of cell search specified for the communication system.

The data buffer 608 enables "offline" search using samples of a received signal that are stored in the buffer. This permits turning off the FE RX 604 to save power. As an alternative, the received signal can pass directly from the filter 606 to the PSS Detector 610.

It will be appreciated that the SSS Detector 612 can compute channel estimates based on PSS symbols detected by the PSS Detection unit, and can use the channel estimates for equalizing the channel before coherent SSS detection. Methods of channel estimation are well known in the art, and are described in, for example, U.S. Patent Application Publication No. 2005/0105647 by Wilhelmsson et al. for "Channel Estimation by Adaptive Interpolation". Channel estimates are not necessary, however, as the SSS Detection unit could perform non-coherent SSS detection.

It will be appreciated that procedures described above are carried out repetitively as necessary, for example, to respond to the time-varying nature of communication channels between transmitters and receivers. To facilitate understanding, many aspects of this invention are described in terms of sequences of actions that can be performed by, for example, suitably configured elements of a programmable computer system. It will also be recognized that various actions could be performed by suitably configured specialized circuits (e.g., discrete logic gates interconnected to perform a specialized function or application-specific integrated circuits), by program instructions executed by one or more processors, or by a combination of both.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of operating a node for a communication system, comprising:
   operating the node according to a first transmission/reception (TX/RX) setup with first node identification (ID) for at least one cell;
   monitoring a load on the node;
   determining whether the load has crossed a threshold; and
   when the load has crossed the threshold, gradually transitioning the node from operating according to the first TX/RX setup with the first node ID, to operating according to a second TX/RX setup with a second node ID for said at least one cell, wherein
   the gradually transitioning includes adding at least one free sub-frame usable for transmitting a signal by the node operating according to the second TX/RX setup, to sub-frames used by the node operating according to the first TX/RX setup,
   operating the node at the same time as two different nodes with the first and the second node IDs, respectively, while gradually transitioning, and the second TX/RX setup differs from the first TX/RX setup by including a different number of antennas, and at least one of a larger or a smaller bandwidth, and a different number of component carriers or subcarriers.

2. The method of claim 1, wherein gradually transitioning comprises ramping up a transmission power of a signal transmitted by the node in accordance with the second TX/RX setup while ramping down a transmission power of a signal transmitted by the node in accordance with the first TX/RX setup.

3. The method of claim 2, further comprising waiting for a time period to elapse and then ceasing transmission of the signal in accordance with the first TX/RX setup.

4. The method of claim 1, wherein adding at least one free sub-frame comprises offsetting a timing between sub-frames transmitted by the node in accordance with the first and second TX/RX setups, respectively.

5. The method of claim 1, wherein monitoring the load comprises monitoring at least one of a total number of resource blocks or channelization codes allocated for transmission by the node, a buffer status of the node, and a number of user equipments connected to the node.

6. The method of claim 5, wherein the threshold corresponds to a fraction of a maximum number of allocable resource blocks or channelization codes.

7. An apparatus for a node for a communication system, comprising:
a scheduler and selector configured to receive information to be transmitted by the node;
a signal generator configured to generate a signal corresponding to the information for transmission by the node through at least one antenna, wherein the signal includes a first node identification (ID) for at least one cell or a single second node ID for said at least one cell; and
a control processor configured to monitor a transmission load on the node and, when the load has crossed a threshold, to gradually transition the node from operating according to a first transmission/reception (TX/RX) setup with the first node ID to operating the node according to a second TX/RX setup with the second node ID wherein
the gradually transitioning includes adding at least one free sub-frame usable for transmitting a signal by the node operating according to the second TX/RX setup, to sub-frames used by the node operating according to the first TX/RX setup,
operating the node at the same time as two different nodes with the first and the second node IDs, respectively, while gradually transitioning, and
the second TX/RX setup differs from the first TX/RX setup by including a different number of antennas, and at least one of a larger or a smaller bandwidth, and a different number of component carriers or subcarriers.

8. The apparatus of claim 7, wherein the control processor is configured to gradually transition the node by ramping up a transmission power of a signal transmitted by the node in accordance with the second TX/RX setup while ramping down a transmission power of a signal transmitted by the node in accordance with the first TX/RX setup.

9. The apparatus of claim 8, wherein the control processor is further configured to wait for a time period to elapse and then cease transmission of the signal in accordance with the first TX/RX setup.

10. The apparatus of claim 7, wherein adding at least one free sub-frame comprises offsetting a timing between sub-frames transmitted by the node in accordance with the first and second TX/RX setups, respectively.

11. The apparatus of claim 7, wherein the control processor is configured to monitor the load by monitoring at least one of a total number of resource blocks or channelization codes allocated for transmission by the node, a buffer status of the node, and a number of user equipments connected to the node.

12. The apparatus of claim 11, wherein the threshold corresponds to a fraction of a maximum number of allocable resource blocks or channelization codes.

13. A non-transitory computer-readable medium having stored instructions that, when executed by a computer, cause the computer to carry out a method of operating a node in a communication system, comprising:
operating the node according to a first transmission/reception (TX/RX) setup with a first node identification (ID) for at least one cell;
monitoring a load on the node;
determining whether the load has crossed a threshold; and
if the load has crossed the threshold, gradually transitioning the node from operating according to the first TX/RX with the first node identification ID to operating according to a second TX/RX setup with a second node ID for said at least one cell, wherein
the gradually transitioning includes adding at least one free sub-frame usable for transmitting a signal by the node operating according to the second TX/RX setup, to sub-frames used by the node operating according to the first TX/RX setup,
operating the node at the same time as two different nodes with the first and the second node IDs, respectively, while gradually transitioning, and
the second TX/RX setup differs from the first TX/RX setup by including a different number of antennas, and at least one of a larger or a smaller bandwidth, and a different number of component carriers or subcarriers.

14. The non-transitory medium of claim 13, wherein gradually transitioning comprises ramping up a transmission power of a signal transmitted by the node in accordance with the second TX/RX setup while ramping down a transmission power of a signal transmitted by the node in accordance with the first TX/RX setup.

15. The non-transitory medium of claim 14, further comprising waiting for a time period to elapse and then ceasing transmission of the signal in accordance with the first TX/RX setup.

16. The non-transitory medium of claim 13, wherein adding at least one free sub-frame comprises offsetting a timing between sub-frames transmitted by the node in accordance with the first and second TX/RX setups, respectively.

17. The non-transitory medium of claim 13, wherein monitoring the load comprises monitoring at least one of a total number of resource blocks or channelization codes allocated for transmission by the node, a buffer status of the node, and a number of user equipments connected to the node.

18. The non-transitory medium of claim 17, wherein the threshold corresponds to a fraction of a maximum number of allocable resource blocks or channelization codes.

* * * * *

UNITED STATES PATENT AND TRADEMARK OFFICE
CERTIFICATE OF CORRECTION

PATENT NO. : 9,084,208 B2
APPLICATION NO. : 12/705879
DATED : July 14, 2015
INVENTOR(S) : Rosenqvist et al.

It is certified that error appears in the above-identified patent and that said Letters Patent is hereby corrected as shown below:

In the claims

In Column 10, Line 51, in Claim 1, delete "with" and insert -- with a --, therefor.

In Column 11, Line 39, in Claim 7, delete "ID" and insert -- ID, --, therefor.

Signed and Sealed this
First Day of December, 2015

Michelle K. Lee
*Director of the United States Patent and Trademark Office*